United States Patent [19]

Ballerstein et al.

[11] 4,326,438
[45] Apr. 27, 1982

[54] CUTOFF MACHINE FOR NON-METALLIC TUBE STOCK

[75] Inventors: George B. Ballerstein, York; Spurgeon E. Kimmel, Wellsville, both of Pa.

[73] Assignee: Yorktowne Paper Mills, Inc., York, Pa.

[21] Appl. No.: 216,624

[22] Filed: Dec. 15, 1980

[51] Int. Cl.³ .......................................... B23B 37/00
[52] U.S. Cl. ..................................................... 82/53.1
[58] Field of Search ......................................... 82/53.1

[56] References Cited

U.S. PATENT DOCUMENTS

| | | |
|---|---|---|
| 964,162 | 7/1910 | Jenkins . |
| 1,413,191 | 4/1922 | Roland . |
| 1,641,866 | 9/1927 | Roberts . |
| 1,740,430 | 12/1929 | Mudd . |
| 1,751,293 | 3/1930 | Sherman . |
| 1,953,205 | 4/1934 | White et al. . |
| 2,019,890 | 11/1935 | Burke . |
| 2,306,721 | 12/1942 | Forter et al. ......................... 82/53.1 |
| 2,699,099 | 1/1955 | Robinson . |
| 2,723,705 | 11/1955 | Collins . |
| 3,051,061 | 8/1962 | Baxter et al. ........................ 82/53.1 |
| 3,540,333 | 11/1970 | Johnson . |
| 3,748,935 | 7/1973 | Beauchet . |
| 3,771,393 | 11/1973 | Gatto et al. ......................... 82/53.1 |

*Primary Examiner*—Harrison L. Hinson

*Attorney, Agent, or Firm*—C. Hercus Just

[57] ABSTRACT

A cutoff machine for non-metallic tubes comprising a pair of rotary saws in transverse alignment within a plane perpendicular to the axis of feed of tube stock incident to continuous discharge from a tube-forming machine, a pair of motors simultaneously driving said saws in opposite rotary directions respectively toward said tube stock from opposite sides, powered propelling mechanism which is fluid actuated and activated by an electric signal instigated by the forward end of the moving tube striking a target switch which originates all subsequent sequential functions of the machine by moving the saws longitudinally from and toward a starting position in opposite directions parallel to the movement of the tube feed stock, additional power mechanism operable to move said saws simultaneously toward said tube stock while said saws are advancing evenly with said stock, first control mechanism operable to effect withdrawal of said saws from said tube stock and a severed tube section prior to terminating longitudinal movement of said saws in the feeding direction of said tube stock, second control mechanism operable to cause reverse longitudinal movement of said saws simultaneously toward said starting position, and discharge mechanism operable to receive cut tube sections immediately upon severance from the stock and clear it from the path of successive cut tube sections.

20 Claims, 9 Drawing Figures

CUTOFF MACHINE FOR NON-METALLIC TUBE STOCK

BACKGROUND OF THE INVENTION

Non-metallic tube stock usually is formed by laminating similar strips of paper or the like spirally upon a mandrel and gluing the strips to each other while feeding the required layers or laminae to the tube being formed until the desired thickness has been achieved. Meanwhile, the tube being formed continuously moves endlessly from the forming machine, whereby severing sections of the tube therefrom is necessary and desirable, the length of the tubes thus severed being controlled by the requirements of customers for the tubes.

Severing sections from a continuously formed non-metallic tube presents problems due to the fact that severing means must not only be advanced into the body of the tube to effect the severance but the severing means also must move longitudinally at the same speed as the tube and, after severance has been accomplished, the severing means must not only be retracted from engagement with the tube but also, very importantly, must be returned to a starting position for a repetition of the cycle.

In many manufacturing procedures at present, it is an objective to constantly increase the speed of production and the formation of tubes is no exception. By way of example, rather than limitation, it is quite common at present to form non-metallic tubes at speeds averaging from sixty thousand to seventy thousand lineal inches per hour, or approximately one thousand inches per minute. Cycles of operation per minute are dictated by the lengths of product required by a customer. Under circumstances, for example, such product tubes having a length of eight or ten feet, for example, will not require as frequent a cycle of operation of the cutting or severing means as when the product is much shorter, as for example, of the order of ten or twelve inches. When long lengths are produced, a severing machine having a single cutter operated in a rectilinear manner is quite satisfactory, wherein the cutter is moved into the tube, travels with it to effect severing, retracts from the tube, and then returns to starting position. Examples of cutting devices of this type, which were developed many years ago, are exemplified in the following U.S. patents:

U.S. Pat. No. 964,162; Jenkins; July 12, 1910
U.S. Pat. No. 1,413,191; Roland; Apr. 18, 1922
U.S. Pat. No. 2,019,890; Burke; Nov. 5, 1935

In an attempt to produce relatively short lengths of a tube and cut such shorter lengths therefrom while the tube is advancing, prior attempts to accomplish this have included the use of a plurality of pairs of disc cutters, mounted on an endless chain, or radial arms on a rotating shaft, the cutting discs being freely rotated, and although in opposed pairs, no means were included to move the cutters toward each other for purposes of facilitating the cutting operation or otherwise. Typical examples of prior art devices of this type are found in the following U.S. patents:

U.S. Pat. No. 1,641,866; Roberts; Sept. 6, 1927
U.S. Pat. No. 1,740,430; Mudd; Dec. 17, 1929
U.S. Pat. No. 1,751,293; Sherman; Mar. 18, 1930

In order to facilitate the individual cutting of sections from a paper tube, it has previously been accomplished by moving pairs of disc cutters toward and from each other by mechanical means. Examples of such procedure are found in prior U.S. Pat. No. 1,953,205 to White et al, dated Apr. 3, 1934, and U.S. Pat. No. 2,723,705 to Collins, dated Nov. 15, 1955. In White et al, no means are illustrated for feeding the tube while the cutting occurs, and apparently, the tube is stationary during each cutting operation and then subsequently advanced. In Collins, only a pair of disc-like cutters are shown with no specific means being illustrated either for operating the same to advance the cutters into the tube or move the same along with the tube as formed.

Still other attempts to sever paper tubes while moving continuously from the forming machine have been developed in which not only are a plurality of cutters mounted for free rotation on shafts which are positively moved toward and from the tube to enhance the cutting operation, but said cutters are also moved with the tube and then withdrawn and retracted to starting position. Examples of this type of apparatus are found in prior U.S. Pat. No. 2,699,099 to Robinson, dated Jan. 11, 1955 and No. 3,540,333 to Johnson, dated Nov. 17, 1970. In Robinson, pneumatic means move the freely-rotatable disc cutters toward the tube to incise the same and hydraulic mechanism moves the cutters axially with the tube. In Johnson, three disc cutters are carried by a circular rotatable carrier wheel and a tightening cable moves the cutters against the tube as the carrier wheel moves axially with the tube as propelled by air cylinder means.

Not only have paper tubes been cut by the devices referred to hereinabove, but, in addition, metallic tubing, such as metal pipes have been cut by mounting disc cutters respectively on pivoted arms and employing a rotatable cam to progressively force the cutters into the body of the pipe and then such cam means relax and permit a spring to retract the cutters from the pipe. One example of such a device is found in U.S. Pat. No. 3,748,935 to Beauchet, dated July 31, 1973.

Although the prior art individually shows certain specific features embodied in the present invention, the employment of a pair of opposed saws which engage and cut a tube moving longitudinally at relatively high speed presents various problems which the invention has solved in ways not suggested by the prior art, details of which are set forth below.

SUMMARY OF THE INVENTION

It is among the principal objects of the present invention to provide a cutoff machine for cutting uniform lengths of non-metallic tube stock into desired lengths immediately upon formation thereof by rotation upon a winding machine, the cutoff machine utilizing a pair of disc saws mounted in a common plane transverse to the path of movement of the tube and including a pair of drive shafts upon which the saws are mounted for longitudinal movement at the same speed as that of the tube while the drive shafts are rotating in opposite directions to effect downward movement of the cutting edges of the saw into said tube from opposite sides while the tube is rotating, whereby only a further partial rotation of the tube results in complete severance while the saws are moved with the tube and then quickly retracted from engagement with the oncoming tube immediately prior to effecting return movement of the cutters to a starting position.

Another object of the invention is to support said drive shafts for the saws on rock shafts having radial arm supports for the drive shafts of the saws, said rock shafts having rocker arms operated in opposite directions through limited arcs by fluid-operated cylinder and piston rod units.

A further object of the invention is to provide key ways or splines along the drive shaft engaged by key means that support said saws.

Still another object of the invention ancillary to the immediately foregoing object is to mount said saws upon rotary heads having anti-friction key means movable along the key ways or splines in the drive shafts, said rotary heads being supported and movable longitudinally of the tube by a carriage movable along a path parallel to the tube in opposite feeding and return directions, said carriage being operated by a first power means and the movement of the aforementioned rock shafts being operated by a second power means.

A still further object of the invention ancillary to the foregoing objects is preferably to utilize power means in the form of pnuematically-operated cylinder and piston rod units, one end of each unit being fixed relative to the frame and the opposite end being connected to the elements actuated thereby, such as the carriage and rocker arms, and delivery of pneumatic pressure to said cylinders being controlled by solenoid-operated valve means mounted stationarily relative to the frame of the machine and engaged by kick-off trip means, movable with said carriage.

A still further object of the invention is to arrange the operation of the solenoid valves and trip means in such manner that the saws are projected into the tube at a very brief interval after longitudinal movement of the saws is initiated in order to permit acceleration of the longitudinal movement of the saws from a dead start and then actuate the movement of the saws into the tube while moving longitudinally therewith and upon completing a cut, the saws are then retracted from engagement of the tube prior to the end of the longitudinal movement thereof, followed by return of the retracted saws to a starting position, all of which occurs under average conditions in about one second of time, the preferred operation being on the average of sixty cycles per minute, but such indication is not intended to be considered restrictive, but merely illustrative.

For purposes of providing relatively compact support and actuating means in the machine, it is another object to provide on the frame a pair of parallel support members at opposite sides of the path of movement of the tube stock, said support members comprising said aforementioned rock shafts, and also providing guide means for said carriage and the elements connected thereto.

Still another object of the invention is to provide a pair of electric motors respectively to drive each of said pair of saws in opposite rotary directions toward each other, said motors being connected to the drive shafts for said saws by endless belts extending around sheaves and, for purposes of permitting lateral movement of the drive shafts toward and from each other, pairs of intermediate double sheaves are mounted for axial rotation about the axes of the parallel rock shafts comprising support members, said motors and drive shafts also having additional sheaves around which belts extend from said intermediate double sheaves.

One further object of the invention is to provide longitudinal guide means for the incoming tube to firmly support the same against downward movement incident to the penetration of the tube by the saws from opposite sides in a downward direction to prevent the tube from kicking up from said guide means, and, further, to achieve this objective, a spring-pressed shoe also is engageable with the incoming tube in opposition to the guide means.

One further object of the invention is to provide means to quickly remove the cut sections of tube from the machine following the complete severance thereof from the oncoming tube, said means preferably employing a longitudinally moving conveyor, means to force the cut sections against said conveyor preferably in the form of an air jet, periodically applied against the cut sections by sequentially operable valve means of a solenoid actuated type, having a switch engaged by a kick-off shoe movable with the carriage which propels the saws along the drive shafts therefor.

A still further object of the invention is to provide a power control system, including an initial switch connected by a circuit to all of the aforementioned switches associated with the pneumatically operated cylinder and piston rod units to move the saws laterally to and from engagement with the tube and propel the same longitudinally in opposite directions with the tube and return the same to starting position, said initial switch having an actuator member engaged by the leading end of an advancing tube, which activates a circuit sequentially to actuate said cylinder and piston rod units to rotate the saws toward each other to enable the same to readily cut tubes of either left or right-hand winding, the position of said initial switch being adjustable longitudinally of the frame of the machine to determine the length of the segments of the tube, which is the distance between the actuating member of said initial switch and the starting position of the saws before commencing longitudinal movement.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENTS

Figure 1:
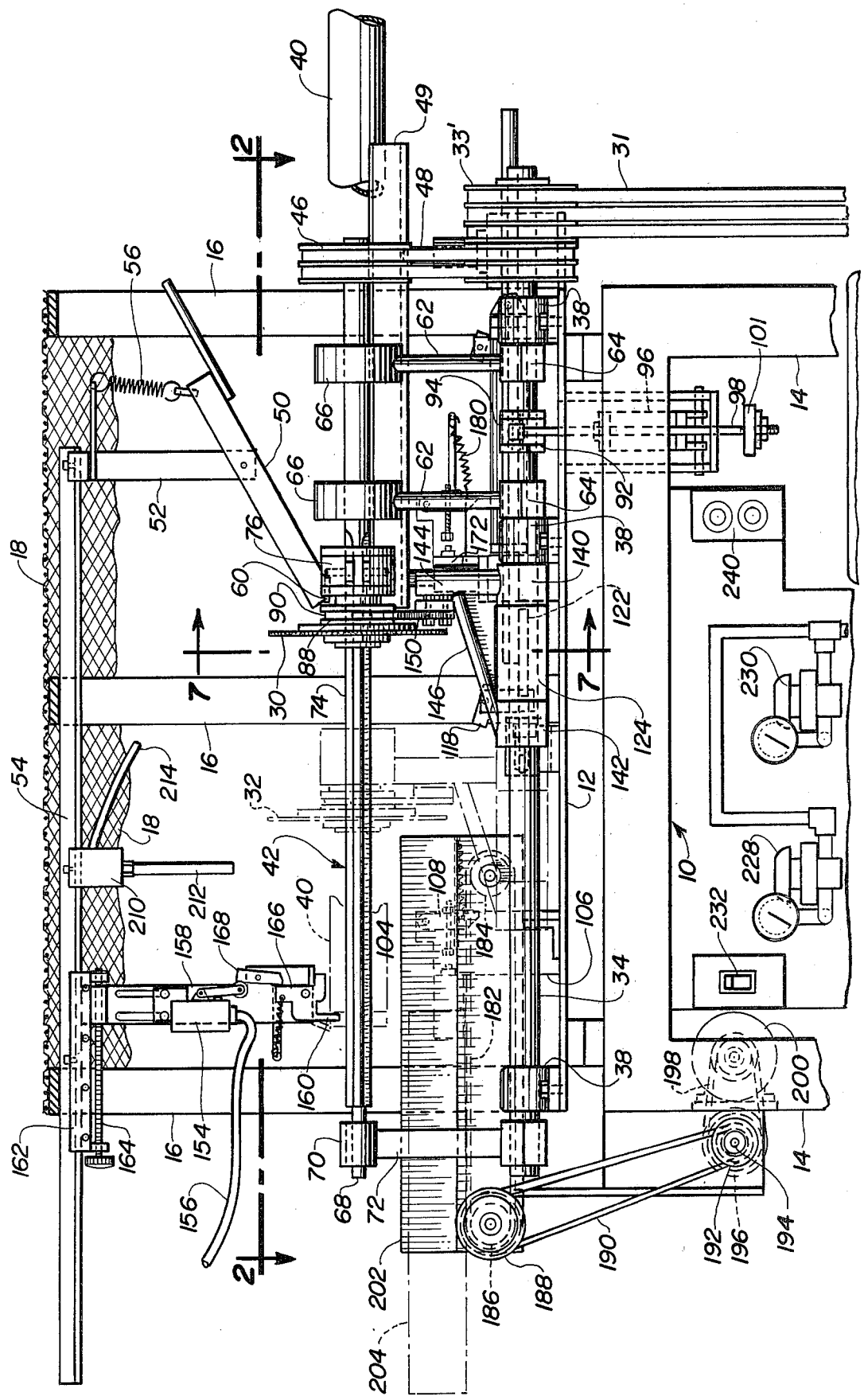
FIG. 1 is a side elevation of the machine comprising the present invention, as seen from the line 1—1 of FIG. 3, part of the lower portion of the machine being broken away and also part of the enclosing screen being removed for purposes of clarity.

This invention primarily pertains to a machine for cutting by means of saws desired successive lengths from a laminated tube formed from paper stock incident to the continuous production of the tube upon a winding machine. Non-metallic tubes of this type are manufactured today in a wide variety of various diameters and lengths, depending upon the capacity of the machine to manufacture the same. If sections of appreciable lengths, such as of the order of ten or twelve feet, are desired, said lengths may be severed from the oncoming tube by single cutter means, especially saws, which are rotated by power means and moved longitudinally with the tube until the severance has been completed and then back the cutter away from the oncoming tube, return it to starting position, and repeat the cycle. Such single saw may be used because of the length of time afforded for the cutting operation.

When relatively short sections of tube of the foregoing type are desired, operation of the cutting mechanism must occur in much shorter intervals of time than those required for longer sections of tube, and the present invention is concerned with the latter type of cutting relatively short sections of tube from a continuously formed length thereof. By way of example, without restriction, the present invention primarily is adapted for use with non-metallic tubes, especially tubes formed from paper stock, which are between two and four inches in diameter, and the lineal speed of the continuously formed tube is within the range of 60,000 to 70,000 lineal inches per hour, or approximately 1,000 inches per minute. Also, by way of example without restriction, the machine embodying the invention, readily operates on the basis of 60 cycles per minute, from cut to cut and one highly satisfactory type of saw diameter is eight inches and the rotational speed of said saw is between 2,000 and 2,500 rpm. Further, a saw type cutting machine of this type readily is operable to produce sections of tube from approximately 10 inches in length up to 30 inches in length. For lengths greater than 30 inches, it is more practical to use a machine employing only a single saw or other form of cutter.

As will be described hereinafter in greater detail, the machine employs a pair of similar saws supported within a common plane transverse to the path of movement of the tube entering the machine. Mechanism is provided for causing the saws to move toward and from each other, making a simultaneous entry or insertion into opposite sides of the tube while the saws are rotating in opposite directions to each other with the inner sections thereof moving downwardly to engage the tube while supported against downward movement, the amount of insertion being such that, for example, approximately 70% of the circumference of the tube is cut by such initial insertion and, remembering that the tube is rotating while being introduced, only a small fraction of rotation completes the cut.

Figure 2:
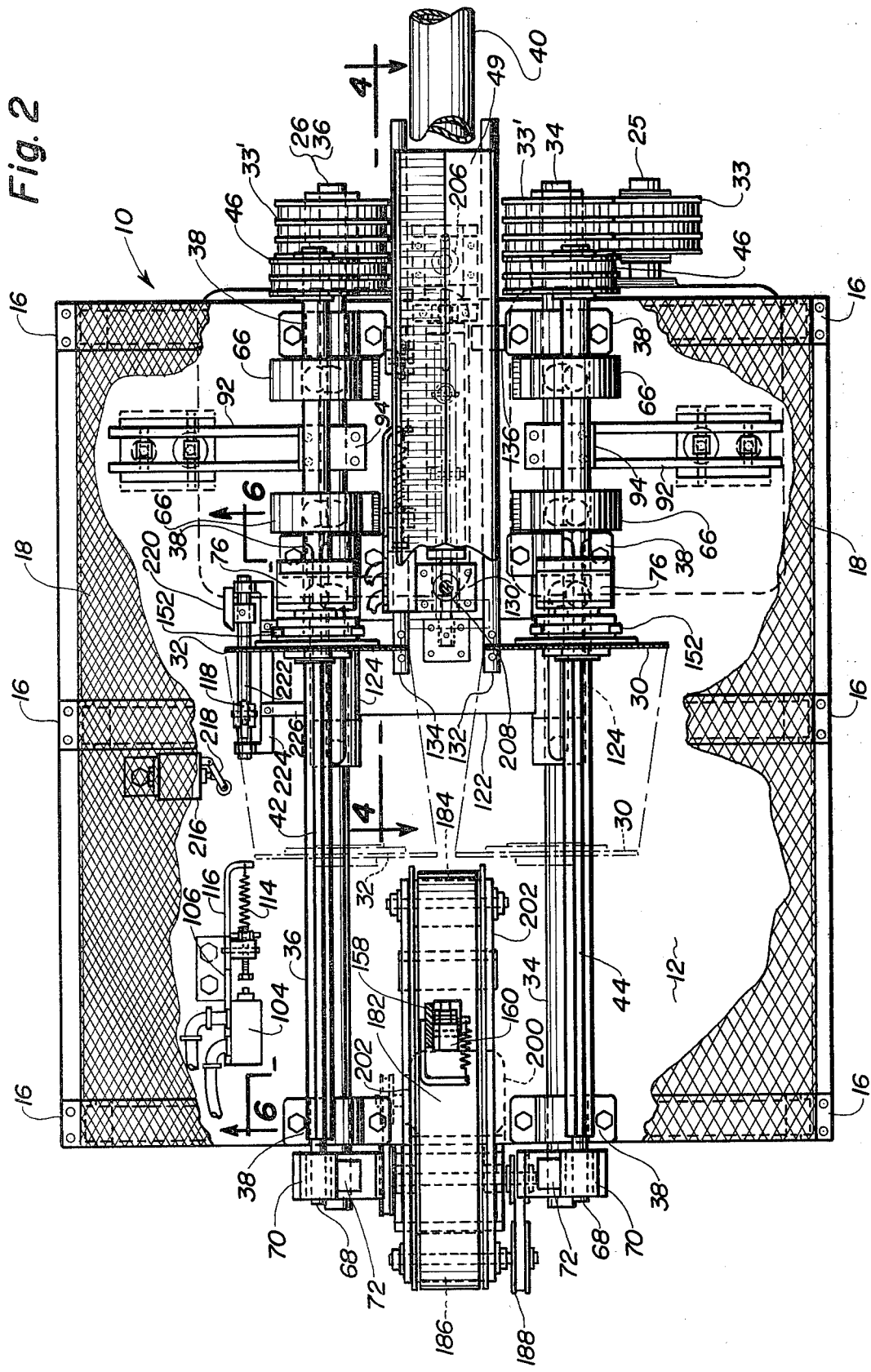
FIG. 2 is a horizontal view of the machine, as seen on the line 2—2 of FIG. 1, with part of the upper covering screen being broken away to disclose details beneath the same.
Figure 3:
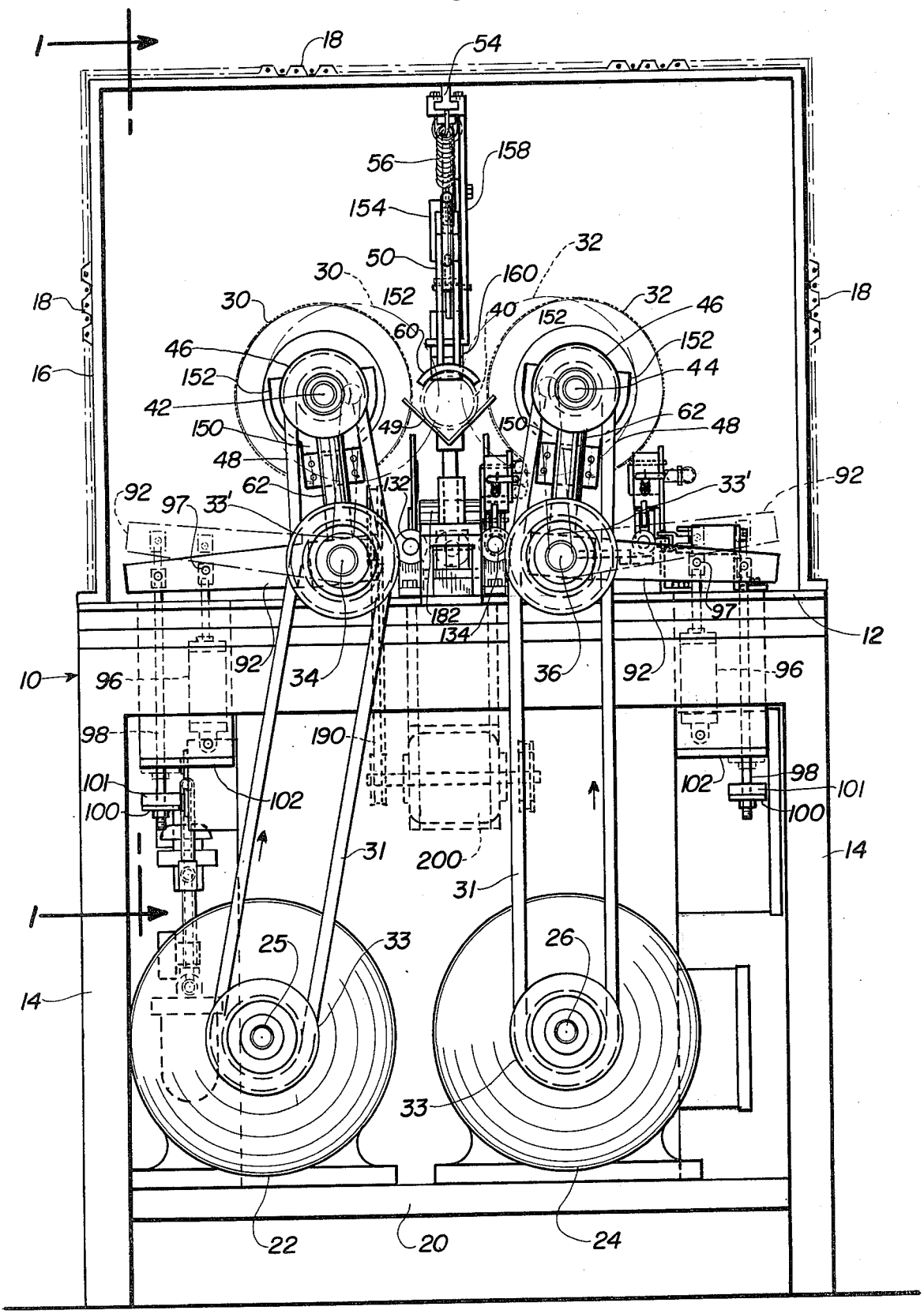
FIG. 3 is a vertical elevation of the feed end of the machine, as viewed from the right-hand end of FIGS. 1 and 2.

Further, in preferred operation of the machine comprising the present invention, it is preferably arranged that a minimal amount of travel of the saws in a longitudinal direction occurs prior to the saws being inserted into the tube, to provide a period of acceleration of the longitudinal movement of the saws from a dead start, following which the insertion of the saws into opposite sides of the tube occurs simultaneously while the saws are moved longitudinally at the same speed as the tube, and upon the completion of the cut, the saws are retracted, while still moving longitudinally, and a brief instant later, the saws are returned to the initial starting position thereof, followed by a repetition of this cycle. Description of all the details and operational functions of the machine is now set forth as follows:

Referring to FIGS. 1-3, the machine comprising the present invention includes a frame 10, essentially comprising a horizontal base plate 12, supported by sturdy legs 14. Extending upwardly from base plate 12 are a plurality of posts 16, the primary purpose of which is to support a screen shield 18, which encloses the moving parts of the machine.

Supported on a cross member 20, see FIG. 3, within the lower portion of the machine, are a pair of motors 22 and 24, having shafts 25 and 26, which respectively rotate in opposite directions, as indicated by the arrows shown in FIG. 3, for rotating the cutting saws 30 and 32 respectively in the arrows shown thereon in FIG. 3. Such rotation is achieved by belts 31 extending around drive sheaves 33 on the motor shafts 25 and 26 and also extending around one part of the compound sheaves 33' which are rotatable about the axis of support members 34 and 36, which are in the nature of rock shafts and are supported adjacent the opposite ends thereof by bearings 38, see FIGS. 1 and 2, secured to the base plate 12, for limited rocking movement, the longitudinal movement thereof being prevented by the spacing of certain additional members on said shaft adjacent bearings, as best shown in FIG. 2.

All of the sheaves described above and hereinafter preferably are multiple type for purposes of supporting a plurality of belts in parallelism to insure effective drive for the saws 30 and 32, which, in general, preferably are of a substantially larger diameter than that of the tube 40 to be sawed, whereby relatively high driving torque is required to develop the corresponding peripheral speed of the saws for rapid sawing of the tube stock.

The saws 30 and 32 are rotatably driven by and are longitudinally slidable along drive shafts 42 and 44 respectively provided therefor. Affixed to one end of said drive shafts are drive sheaves 46 and sets of drive belts 48 extend around the sheaves 46 and also around the additional set of sheaves of the compound sheaves 33'.

LATERAL MOVEMENT OF THE SAWS

The machine is provided adjacent the inlet end with a trough-shaped guide 49, which forms a support for the leading end of the tube 40, incident to the saws 30 and 32 being inserted into opposite sides of the tube, preferably to an equal extent, while the tube is rotating and while the edges of the saws which engage the tube are both moving downwardly relative toward the rigid guide channel 49, thereby offering ample support to the tube, but for further purposes of steadying the tube while being sawed, an additional rock arm 50, see FIG. 1, is supported above the entering tube 40 by means of a bracket arm 52, which is fixed to a horizontal supporting rail 54, which has additional functions described hereinafter. A spring 56 tensions the lower end 58 of the arm 52, which supports an arcuate shoe 60, which slidably engages the longitudinally moving tube 40, as readily seen in FIGS. 1 and 3.

The drive shafts 42 and 44 are each supported by pairs of arms 62, which are connected at one end to support members 34 and 36 by means of suitable collars 64 clamped to the support members 34 and 36, as best shown especially in FIG. 1, the upper ends of said arms having bearings 66 fixed thereto for supporting the right-hand cylindrical end portions of the shafts 42 and 44, as seen in FIG. 1, while the opposite ends of said shafts adjacent the discharge end shown at the left-hand end of FIGS. 1 and 2, has a reduced coaxial portion 68, supported in bearing 70 connected to the upper ends of additional arms 72 secured to the adjacent ends of the support members 34 and 36, which are the aforementioned rock shafts.

One of the advantageous features of the present invention comprises the fact that the drive shafts 42 and 44 are only rotatable and do not move longitudinally. Accordingly, in order to enable the saws 30 and 32 to move longitudinally with respect to the tube stock 40, the saws move longitudinally along the drive shafts but are keyed thereto for rotation therewith by means of longitudinal splines 74 formed therein, preferably in the nature shown in FIG. 7, the splines extending between the innermost bearing 66 and the reduced end section 68 of each drive shaft. For purposes of supporting the saws 30 and 32 for longitudinal movement along the drive shafts but rotational movement therewith, the saws are supported by a compound type of rotary head 76, having end plates 78 which secure together a plurality of segmental members 80, which support short shafts having anti-frictional rollers 81 thereon and supported in a manner having rolling support within the splines 74, as can be visualized from FIGS. 7 and 8. This arrangement permits ready longitudinal movement of the head 76 along the drive shafts bur prevents relative rotation therebetween and thus, establishes effective rotary drive means for the saws 30 and 32. The end plate 78 nearest the saw 32, as shown in FIG. 8, has a sleeve 82 extending from the outer end thereof, the exterior of said sleeve being cylindrical and the outer end being threaded to receive a retaining nut 84, which directly clamps the saw blade 32 between two face plates 86, one of which abuts a circular member 88, clamped against or otherwise secured to the face plate 86 and disposed against the shoulder, shown in FIG. 8, upon the sleeve 82 on the left-hand end plate 78, shown in said figure. The circular member 88 has an annular groove 90 therein for purposes to be described hereinafter.

In view of the radial arms 62 and 72 supporting the drive shafts 42 and 44 for rocking movement toward and from each other to produce transverse movement of the saws 30 and 32 for insertion and withdrawal movement relative to the tube stock 40, the machine includes a rock arm 92 for each of the shaft type support members 34 and 36, which extend radially in opposite directions respectively upon the support members 34 and 36, as best shown in FIG. 3, in which the rock arms are shown in full lines in the position they occupy when the saws 30 and 32 are withdrawn from the tube stock 40, while in phantom, said rock arms are shown elevated and the saws 30 and 32 are shown in the phantom positions in which they have been inserted at their peripheries into the tube 40 to a substantial extent, for example, amounting to as much as 70% or more, thereby leaving only a very small remaining portion of the walls of the tube to be severed and, as mentioned hereinabove, considering the fact that the tube is rotating while being advanced longitudinally, only a small fraction of a second is normally required to complete the severance of a section of the tube from the oncoming stock, immediately after which, the saws can be retracted, and such retraction being accomplished immediately prior to commencement of the return movement of the saws to starting position as described hereinafter.

To effect the rocking movement of the shaft type supporting members 34 and 36, the inner ends of the rock arms 92 are provided with collars 94, best shown in FIGS. 1 and 2, which are securely clamped to the support members 34 and 36. Power means, hereinafter referred to as second power means in the claims, are provided for movement of the rock arms 92 in rocking manner by means of a preferably pneumatically-operated cylinder and piston rod unit 96, the piston rod end of which is secured by a pin 97, or otherwise, to the rock arms 92 and upward movement of said arms which results in determining the depth of penetration of the saws into the tube stock 40, is controlled by stop means comprising a vertical rod 98, having an adjustable flanged nut 100, which adjusts the position of shock absorbing resilient washer block 101 that abuts a horizontal bracket 102, to one portion of which the cylinder end of the cylinder and piston rod unit 96 are also attached.

Figure 6:
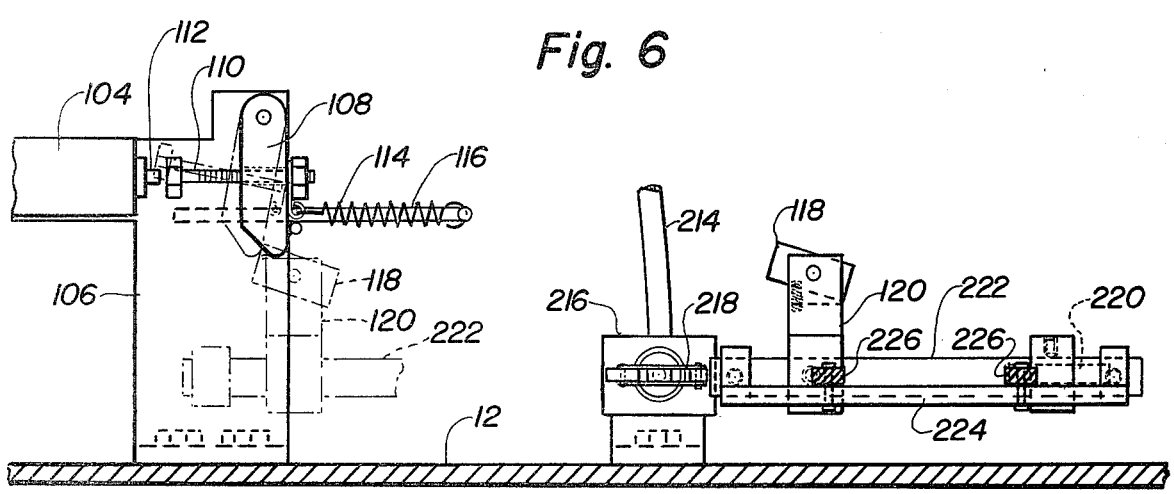
FIG. 6 is a fragmentary vertical sectional view of details of some of the control mechanism of the machine, as seen on the line 6—6 of FIG. 2.

Control of delivery of the pneumatic fluid respectively to opposite ends of the cylinders 96 is effected by a solenoid operated shiftable valve unit 104, see FIGS. 2 and 6, which is supported by an upstanding bracket 106, which is fixed to base plate 12. Referring to FIG. 6, it will be seen that the bracket 106 supports a short lever 108, having an adjustable actuating bolt 110, adjustable lengthwise with respect to lever 108, for purposes of affording adjustable contact between the head of the bolt and a valve actuating plunger 112 in the unit 104. The lower end of lever 108 is connected to one end of a spring 114 supported on an arm 116, extending from bracket 106, and the lower end of the lever 108 is adapted to be engaged by a dog trip lever 118, shown in phantom in FIG. 6 at the left-hand, and in full lines adjacent the right-hand end, said dog being carried by a bracket 120, supported by a longitudinally movable means associated with the longitudinal movement of the saws 30 and 32, as described hereinafter. It can be visualized from FIG. 6 that the dog 118 is engageable with the lever 108 to move it clockwise, and may even move slightly past it, but it will be seen from the right-hand end of FIG. 6 that the dog 118 is spring biased upwardly for yieldable downward movement and thereby clear the end of the lever 108 upon return movement toward the right, as viewed in FIG. 6.

LONGITUDINAL MOVEMENT OF THE SAWS

Figure 4:
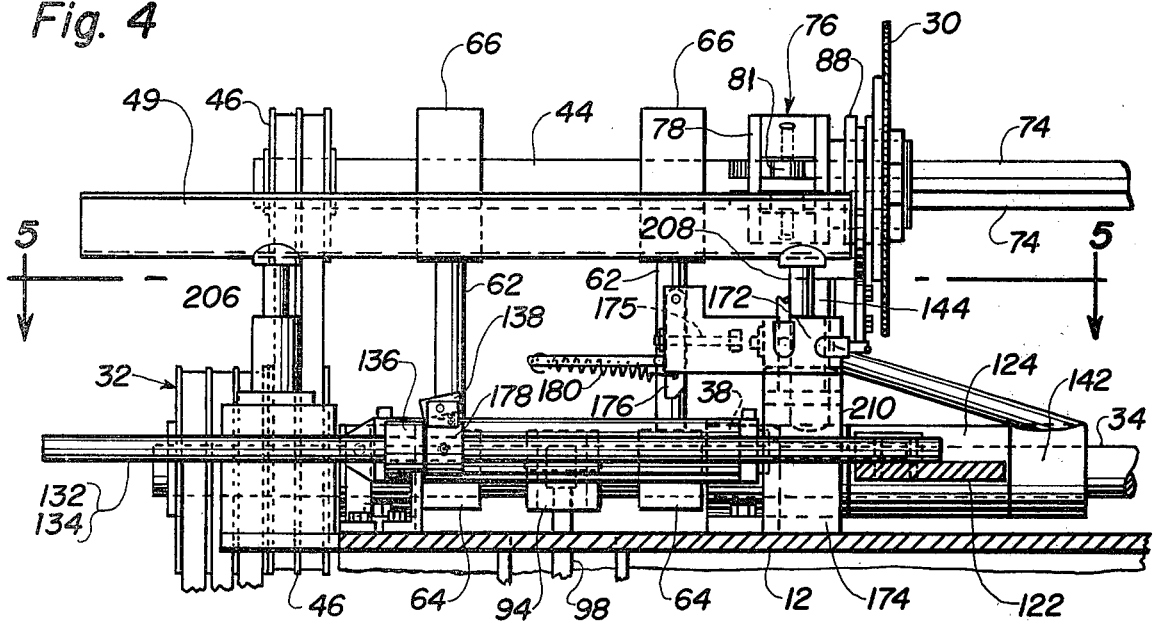
FIG. 4 is a fragmentary vertical sectional view of a portion of the machine showing details of the saw supporting mechanism as seen on the line 4—4 of FIG. 2.
Figure 5:
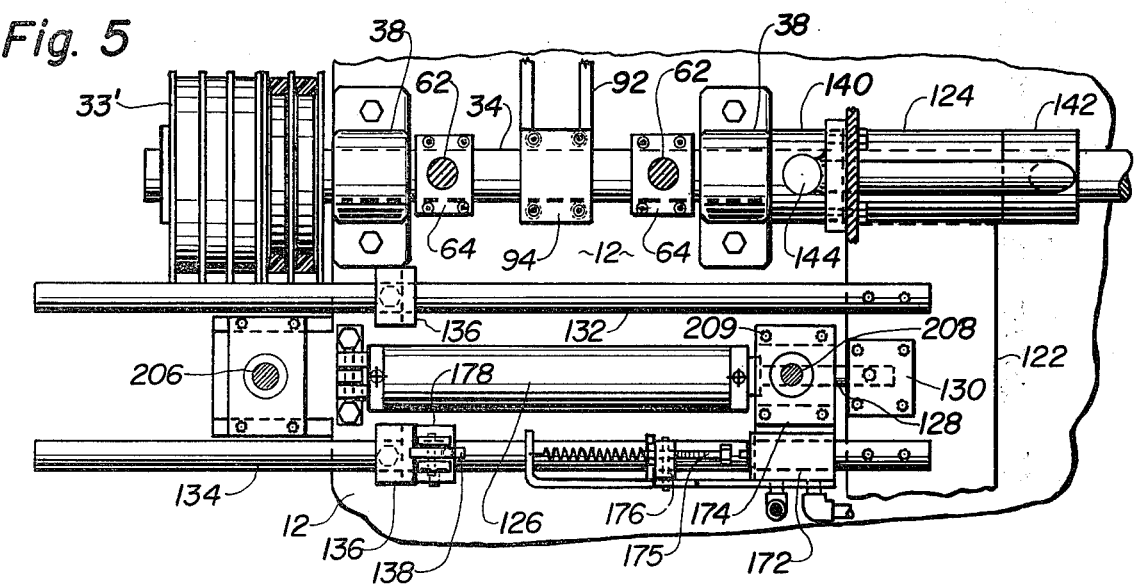
FIG. 5 is a fragmentary horizontal sectional view of the portion of the machine shown in FIG. 4, as seen on the line 5—5 thereof.
Figure 7:
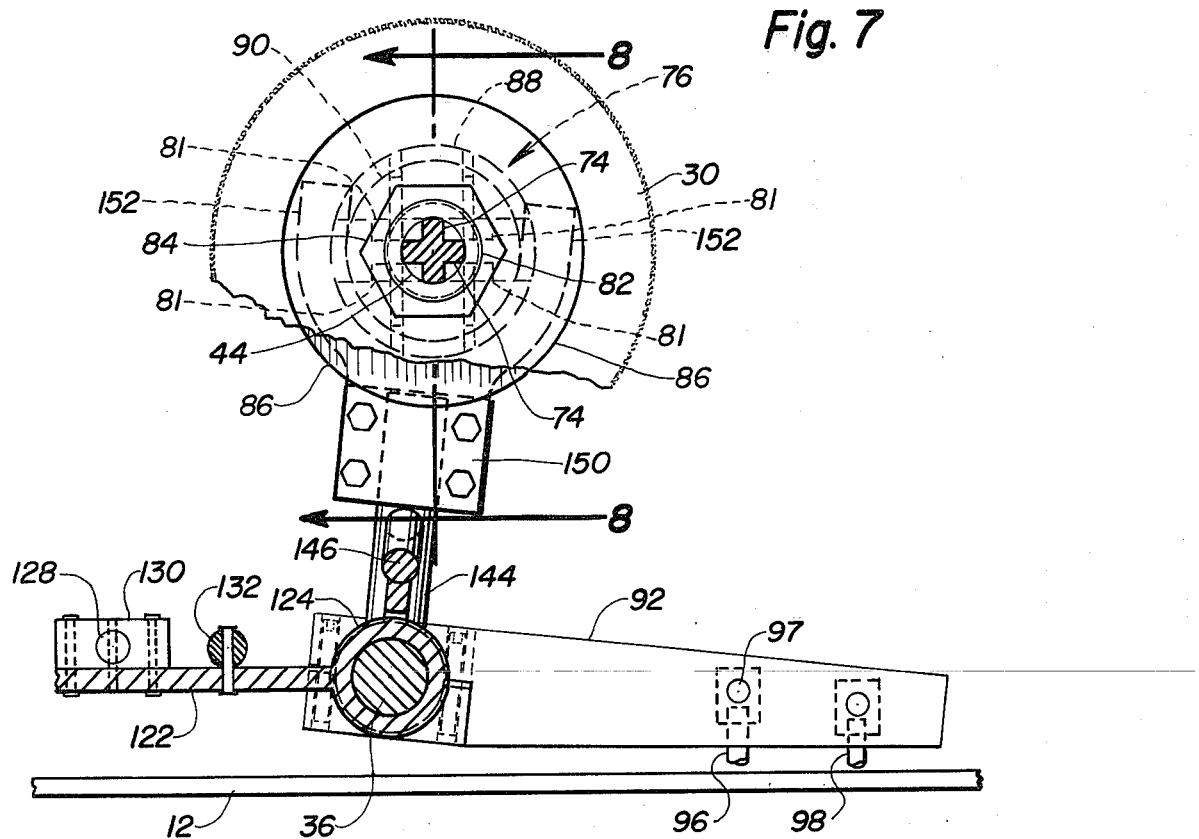
FIG. 7 is a fragmentary vertical sectional view of details of the saw supporting mechanism of the machine, as seen on the line 7—7 of FIG. 1.
Figure 8:
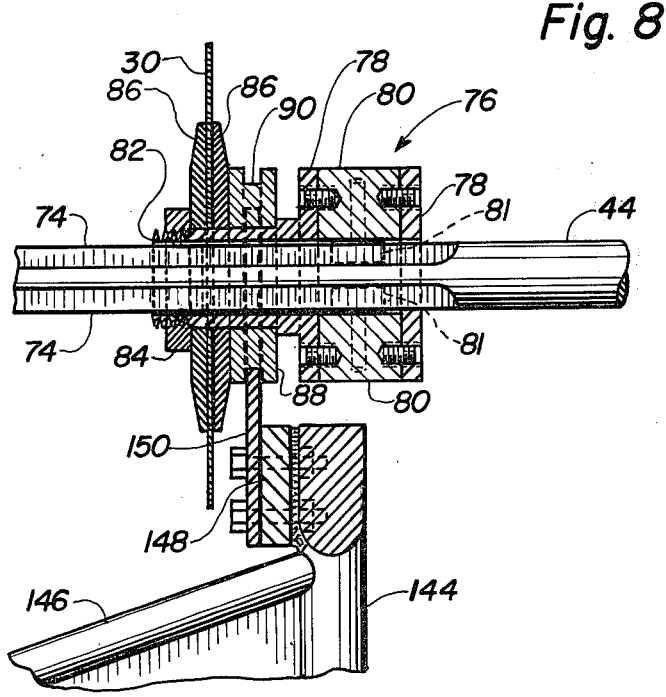
FIG. 8 is a fragmentary vertical sectional view of a portion of the saw supporting mechanism of the machine, as seen on the line 8—8 of FIG. 7.

Saws 30 and 32 are movable longitudinally simultaneously within a common plane transverse to the axis of movement of the tube stock 40 by means of a transversely extending flat plate comprising a carriage 122, shown fragmentarily in cross-section in FIG. 7, and also shown in cross-section in FIG. 4, and partially in plan view in FIG. 5. Opposite ends of the carriage plate 122 have guide sleeves 124 fixed thereto for slidable movement respectively upon the shaft-type support members 34 and 36, which extend longitudinally along the frame respectively at opposite sides of the path of movement of the tube stock 40 incident to being severed more or less along a mid-portion of the travel of the saws as can be diagrammatically visualized from FIG. 1 between the full line and phantom illustration of the saw 32. The principal purpose for the carriage 122 is to connect first power means to the saws to effect longitudinal movement thereof along the drive shafts 42 and 44, said first power means comprising a pneumatic cylinder and piston rod unit 126, one end of the cylinder being anchored to base plate 12, and the opposite end comprising the piston rod 128 being connected to a bracket 130 fixed to the carriage plate 122.

Also connected to and movable by the carriage 122 are a pair of guide rods 132 and 134, which are slidably supported intermediately the ends thereof by fixed guide bearings 136, see FIGS. 4 and 5, which extend to and are affixed to the base plate 12. The guide rods 132 and 134 afford steadiness to the movement of the carriage 122, and in addition, the guide rod 134 also supports a trip dog 138, for purposes to be described.

For purposes of affording compactness in the mechanism, and also provide suitable means for certain switch actuating elements and the like, means for moving the saws 30 and 32 longitudinally of the drive shafts comprises a pair of guide sleeves 140 and 142, which, as best shown in FIG. 1, straddle the opposite ends of the guide sleeves 124 on the carriage 122. A radial arm 144 extends upward from each guide sleeve 140 and terminates below the level of the guide channel 48 for the tube stock, as clearly shown in FIG. 1. A diagonal brace member 146 is respectively connected at opposite ends to the guide sleeve 142 and radial arm 144.

Referring to FIGS. 7 and 8, it will be seen that the upper end of the radial arm 144 is fixed to a transverse block 148 by welding or otherwise, and attached to the free face thereof is one end of a yoke 150, the arms 152 of which are shown in phantom in FIG. 7, the inner surfaces of said arms being disposed within the annular groove 90 formed in the circular member 88.

It will be seen from the foregoing that operation of the first power means comprising fluid-operated cylinder 126 and its piston rod 128 moves the carriage 122 initially outward away from cylinder 126 to carry the saws 30 and 32 simultaneously from the starting position, for example, shown in exemplary manner in FIGS. 1 and 2, toward the discharge end, by reason of the yokes 150 being arranged with the arms thereof in the annular grooves 90. Such movement is caused by reason of the guide sleeves 124 on opposite ends of the carriage 122 being straddled by the additional guide sleeves 140 and 142 rigidly connected to the radial arms 144, which directly support the propelling means comprising the circular members 88 to which the saws are clamped. Such movement of the saws longitudinally with the incoming tube stock 40 is controlled by a cycle control switch 154, having an electrical conduit 156 extending thereto, as shown in FIG. 1. The switch is supported upon a vertical arm 158, the upper end of which is supported for longitudinal movement along the horizontal supporting rail 54. For purposes of precise longitudinal adjustment of the position of the actuating member 160 for engagement of the leading end of the tube stock 40, as shown in phantom in FIG. 1, the upper end of the vertical bracket 158 is adjustable longitudinally of an intermediate guide member 162, which is adjustable along supporting rail 54, the length of which is adequate to readily accommodate the machine to sever sections of tube, for example, up to 30 inches or 3 feet in length, or for practical purposes, as short as approximately 10 inches. To effect more precision in such positioning of the member 160, however, a threaded rod 164 is supported between the opposite ends of the intermediate guide member 162, whereby upon rotation thereof in opposite directions, a very precise positioning of the actuating member 160 may be achieved. Any suitable support for the actuating member 160 upon the bracket 158 may be employed, particularly so as to be of a nature to permit contact and instant removal from the path of movement of the oncoming tube, and this is achieved in the specifically shown illustration in FIG. 1, wherein a spring pressed pivoted member 166 from which the actuating member 160 extends, is mounted to engage an intermediate pivoted lever 168, which engages an actuating arm 170, pivoted upon switch housing 154 in a manner to compress the switch button extending therefrom as clearly shown in FIG. 1.

Figure 9:
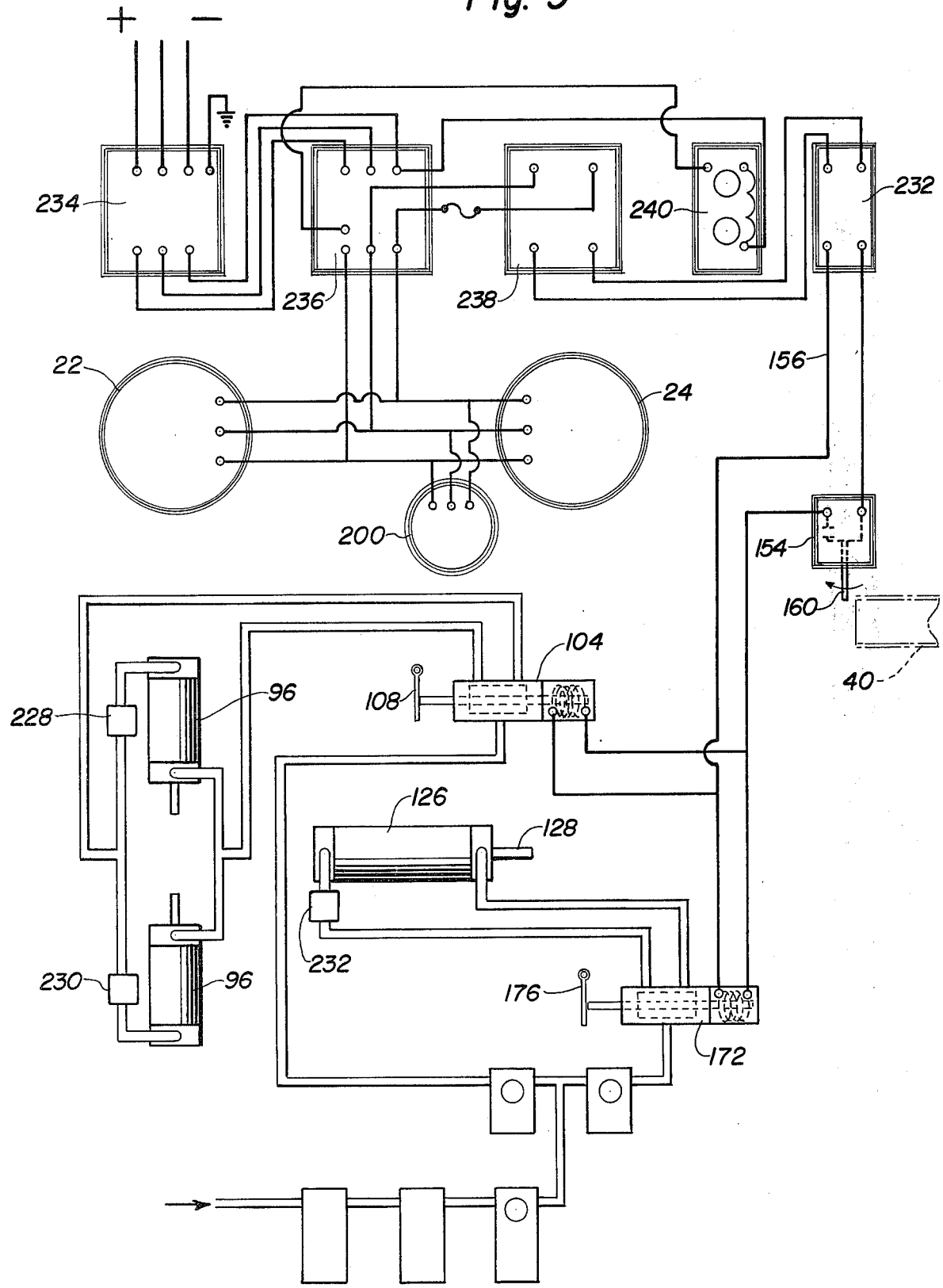
FIG. 9 is a diagram illustrating the electrical and pneumatic power circuitry of the machine, illustrated in the preceding figures.

Referring to the circuit diagram of FIG. 9, it will be seen that switch 154 is in the nature of a starting switch, which instantly energizes the solenoid of the shiftable valve unit 104 which controls the second power means comprising the pneumatic cylinder and piston rod units 96 by which the saws are moved laterally toward and from the tube stock 40 and, in addition, the switch 154 also instantly energizes the solenoid of the solenoid-operated shiftable valve unit 172, best shown in the lower portion of FIG. 5, in horizontal view, and in vertical view, in FIG. 4, said unit being supported by a vertical bracket 174 extending to the base plate 12 and fixed thereto. It will be seen from FIG. 4 that the actuating button on valve unit 172 is engaged by an adjustable bolt 175, carried by pivoted lever 176, which is engageable by dog 138 carried by sleeve 178 on guide rod 134, as seen in FIGS. 4 and 5, the sleeve 178 being adjustable longitudinally of the guide rod 174 by means of a set screw or otherwise. Tension spring 180 restores the pivoted lever 176 to starting, inactive position, following the return of the carriage 122 to the starting position of the saws. Actuation of the value unit 172 occurs only at the end of the desired amount of travel for the saws longitudinally and this operation occurs only after the second power means comprising the pneumatic cylinder and piston rod units 96 have effected retraction of the saws from engagement with the tube stock 40.

The entire operation of the initiation of advancing movement of the saws, movement of the same into penetration with the tube stock, retraction of the saws therefrom, completion of the longitudinal movement of the saws, and return thereof to starting position all occurs in a matter of approximately one second in time when, for example, cutting tubes of approximately 3 inches in diameter and approximately 12 inches long, such indication being for exemplary purposes only, rather than restriction. It will thus be seen that especially because of the extent of penetration of the saws being capable of cooperating to jointly saw approximately two-thirds to three-fourths of the circumference of the tube stock, and the fact that the tube is continuously rotating while being cut, the remaining uncut portion of the tube will be effected jointly by both saws in a very small fraction of a revolution of the tube and while the saws are being rotated at relatively high speed, it will be seen that the length of longitudinal travel of the saws need only be substantially less than the longitudinal portions of the rod-type supporting members 34 and 36, which is possible between the intermediate bearings 38 and the endmost bearings 38 adjacent the discharge end of the machine. Following complete severance of a section of the tube from the tube stock, the saws then immediately may be retracted and thereafter instantly return to starting position, thus making the very short interval of operation referred to above possible in rendering the machine capable of very rapid production.

Due to the capability of rapid production, it is essential that the severed sections of the tube be removed from the machine at a rapid rate, and this is accomplished by means of a discharge conveyor 182, which as shown in FIG. 1, is provided with an upper surface movable outwardly from the machine as supported by a pair of rollers 184 and 186, the roller 186 being mounted upon a shaft upon which a sheave 188 is connected and around which a driving belt 190 extends downwardly to a drive sheave 192 fixed to a shaft 194 upon which a driven sheave 196 is secured for engagement by a drive belt 198, which is driven by another sheave on the drive shaft of motor 200, all as best shown in FIG. 1. Preferably, vertical side plates 202 extend along opposite sides of the discharge conveyor 182, as shown in exemplary manner in FIG. 1, and between which an exemplary severed section 204 completely separated from the tube stock, is in process of being discharged.

Referring to FIGS. 1, 2 and 3, it will be seen that the guide trough 49, which steadies the leading end of the tube stock 40 as introduced to the machine for severing of predetermined lengths thereof, is supported adjacent opposite ends respectively by posts 206 and 208, having brackets on the lower ends thereof secured to the base plate 12, the innermost post 208 being supported by a bracket 209, best shown in FIG. 5, in the nature of a bridge beneath which the piston rod 128 of the cylinder 126 may move, as readily appreciated from FIGS. 4 and 5. The posts 206 and 208 provide ample sturdy support for the guide channel 49.

To insure that the rapid production of severed sections 204 will not experience any impedance or buildup of severed sections in the machine, the speed at which the discharge conveyor 182 operates is preferably relatively high, and also to insure that the severed sections will engage said conveyor, attention is directed to FIG. 1, wherein it will be seen that there is mounted in the upper portion of the frame of the machine, an air head 210, which, for example, may be longitudinally movable along the horizontal supporting rod 54. A downwardly extending air jet tube 212 depends from the air head 210 a desired amount to direct a blast of air momentarily onto a severed section of tube and thereby insure rapid downward movement of the same onto the discharge conveyor 182. The head 210 is connected by any suitable means, such as a conduit 214, to a supply of air, not shown. The supply of air is controlled by the tube 214 extending to a control valve 216 in the air line, see FIGS. 2 and 6, wherein the control valve 216 is shown to be fixed to the base plate 12, for accurate positioning so that the actuating arm 218 thereof, which is engaged by a shoe 220, see FIG. 2, which is movable with the carriage 122, and is supported adjustably along a rod 222, which extends between opposite ends of an elongated yoke 224, shown in FIG. 6, as well as FIG. 2, the yoke being supported by arms 226, which extend laterally from one end of carriage 122, as can be envisioned from FIG. 2.

From the foregoing, it will be seen that the tube-cutting machine comprising the present invention provides for rapid operation at the exemplary speeds described in detail above and illustrated in the drawings, the mechanism being compact and the entire machine readily being capable of movement for operation adjacent a tube-winding machine. In the preferred operation of the machine, it is only necessary to provide a source of air under pressure for pneumatic operation of the cylinder and piston rod units comprising the aforementioned first and second power means, as well as electric energy to drive the three motors required, as well as actuate the solenoids connected to the pneumatic flow control valves. Further, by reference to FIG. 9, it will be seen that additional exemplary flow control valves 228 and 230 are disposed in the lines leading to one end of the cylinder unit 96, and these are adjusted when the machine is being set up for a certain cutting operation of tubes having a predetermined diameter and from which sections of uniform length are to be severed. In addition, another flow control valve 232, is connected in the air conduit to one end of the cylinder and rod unit 126, comprising the first power means. The valve 232 is capable of operation to insure very accurate speed in the longitudinal movement of the saws to insure that the same will travel exactly at the same speed as the tube stock 40. During operation of the machine, this is the only valve which normally requires any attention after initial set up of the machine has taken place.

Further referring to FIG. 9, in the upper portion thereof, there is diagrammatically illustrated an initial safety switch 234 connected to the incoming power line, the electric circuit connecting thereto the motor starter 236 to which a transformer 238 is connected for reduction of the line voltage to domestic-type voltage, such as 110 volts, with which the push button-type starting switch 240 is in circuit. The transformer 238 also is connected to a control circuit switch 242, which is in series with the cycle control switch 154, the actuating member 160 of which is in line to be engaged by leading end of the incoming tube stock 40.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A cutoff machine for cutting uniform lengths of non-metallic tube stock into desired lengths immediately upon formation thereof by rotation on a winding machine and comprising in combination,
   a. a frame having inlet and discharge ends and means to support said tube stock at said inlet end,
   b. a pair of parallel drive shafts mounted for rotation in opposite directions on said frame at opposite sides of said tube stock,
   c. a pair of disc saws respectively mounted upon said shafts in a common vertical plane transverse to said tube stock and driven thereby for rotation downward into opposite sides of said rotating tube stock,
   d. motor means connected to said drive shafts to drive the same in opposite direction toward each other,
   e. means supporting said drive shafts and saws for transverse movement toward and from each other for insertion and withdrawal of said saws relative to said tube stock,
   f. first power means to move said saws longitudinally along said drive shafts from a starting position at the same speed as said tube stock and return said saws to said starting position,
   g. second power means connected to said means supporting said drive shafts and saws for said transverse movement toward and from each other, and h. control means for said second power means operable to effect said transverse movement of said shafts and saws from each other prior to operation of said first power means to return said saws to said starting position.

2. The cutoff machine according to claim 1 further including a conveyor at the discharge end of said frame movable outwardly from said discharge end of said frame, and means operable to move severed sections of said tube onto said conveyor.

3. The cutoff machine according to claim 1 in which said drive shafts and saws are connected by key means to cause rotation of the saws by said shafts and also permit movement of the saws longitudinally along said shafts simultaneously to effect longitudinal movement of said saws with said tube stock while severing a section of tube therefrom.

4. The cutoff machine according to claim 3 further characterized by said saws each being fixed to a rotary head longitudinally movable along said drive shafts and having anti-friction type keying means movable along splines formed in said shafts.

5. The cutoff machine according to claim 4 in which said splines are cruciform in cross-section and said anti-friction keying means comprising rollers supported in said rotary head for rolling engagement with surfaces of said cruciform splines.

6. The cutoff machine according to claim 1 further characterized by said support means for said drive shafts comprising a pair of parallel support members at opposite sides of the path of movement of said tube stock, and means supporting said support members for rocking movement in opposite directions relative to said frame to effect said transverse movement of said drive shafts toward and from each other.

7. The cutoff machine according to claim 6 further including a carriage movable in opposite directions along said parallel support members, means connecting said first power means to said carriage, and means engaged by said carriage and interconnected to said saws to effect said longitudinal movement of said saws along said drive shafts.

8. The cutoff machine according to claim 7 in which said support members comprise a pair of parallel shafts supported in fixed bearings on said frame, actuating rocker arms respectively connected at one end to said shafts and extending outwardly in opposite directions therefrom and means connecting said rocker arms to said second power means and operable to rock said shafts in opposite directions to move said saws toward and from said tube stock.

9. The cutoff machine according to claim 8 in which said parallel shafts have arms extending perpendicularly therefrom and provided with bearings on the outer ends thereof rotatably supporting said drive shafts for rocking movement of said drive shafts and saws thereon toward and from the path of movement of said feed stock in said machine.

10. The cutoff machine according to claim 8 further characterized by said power means comprising fluid-operated cylinder and rod units operable in opposite directions, one end of said units respectively being connected to the outer end of each actuating arm and the opposite being connected to said frame, and adjustable shock-absorbing stop means connected to said actuating arms to limit movement of said arms in a direction to move said saws into said tube stock.

11. The cutoff machine according to claim 10 further characterized by said first power means operable to move said saws longitudinally comprising another fluid-operated cylinder and rod unit connected at one end to said carriage and the other end of said unit being connected to said frame.

12. The cutoff machine according to claim 7 further characterized by said means engaged by said carriage and interconnected to said saws to effect longitudinal movement of said saws along said drive shafts comprising support means extending from said support members respectively toward said drive shafts, and further including a rotary head connected to each saw and keyed longitudinally to said drive shaft for rotation therewith and movable therealong in opposite directions, and said support means carrying a yoke received within an annular groove in said rotary head and operable to effect movement of said saws along said drive shafts by movement of said carriage along said guide means.

13. The cutoff machine according to claim 1 in which said motor means comprises a pair of motors having motor shafts rotatable in opposite directions, drive sheave means on said motor shafts, driven sheave means on said drive shafts, additional shaft means intermediately between said motor shafts and drive shafts and disposed on axes fixed relative to said frame, pairs of adjacent transfer sheave means on said additional shaft means respectively in vertical alignment with said sheave means on said motor shafts and drive shafts, and sets of endless belts respectively between one of said pairs of transfer sheave means and said sheave means on said motor shafts and the other of said pairs of transfer sheave means and said sheaves on said drive shafts, whereby said drive shafts may move toward and from each other incident to moving said saws thereon toward and from said tube without affecting the driving relationship between said motors and drive shafts.

14. The cutoff machine according to claim 13 in which said additional shaft means comprises a pair of parallel shafts fixed longitudinally relative to said frame and operable as guide means for longitudinal movement of said saws.

15. The cutoff machine according to claim 14 further characterized by said frame having support means for opposite end portions of said parallel shafts in the form of bearings permitting only limited rotational movement of said shafts to function incident to movement of said saws toward and from each other.

16. The cutoff machine machine according to claim 1 further characterized by said first power means comprising a fluid-operated cylinder and rod unit connected between said frame and said propelling means for said saws, said second power means comprising a pair of fluid-operated cylinder and rod units respectively connected at one end to said frame and the other ends being connected to said rockable support means, and said machine further including solenoid actuated fluid control valves connected in fluid circuits between a source of fluid and opposite ends of said cylinders of said units, an electrical control circuit connected to the solenoid coils of said valves, an on-off operating switch connecting said circuit to a source of current, a cycle control switch positioned upon said frame and having an actuating member projecting into the path of movement of the leading end of the advancing and rotating tube stock and operable upon contact therewith to initiate operation of said solenoid valves respectively to move said saws into sawing engagement with opposite sides of said rotating tube and simultaneously move said propelling means to carry said saws therewith longitudinally with said tube at the same speed thereof and thereafter retract said saws and return said propelling means and saws to said starting position.

17. The cutoff machine according to claim 16 further characterized by said fluid-operated cylinder and rod units being reversibly operable and the solenoid switches of the fluid control valves for said units being initially actuated by said cycle control switch when contacted by said tube stock to move said saws into engagement with said tube and move the same longitudinally therewith, and said machine also including trip-type operating means mounted on members supporting said saws and movable therewith to engage solenoid switches which reverse the movement of said fluid control valves and retract said saws from engagement with the tube stock and thereafter return said saws to starting position.

18. The cutoff machine according to claim 17 in which said machine further includes a carriage comprising said propelling means which is movable longitudinally upon said frame along a path parallel to said tube stock and having means engageable with said saws to move the same from the starting position and return the same thereto after said saws sever a section from said tube stock, and said cylinder and rod unit comprising said first power means being connected to said carriage to propel it as described and the solenoid switch for said unit being connected to said carriage for movement therewith.

19. The cutoff machine according to claim 18 further characterized by said pair of fluid-operated cylinder and rod units comprising said second power means being supported by said frame and the solenoid control valves being supported by said frame adjacent the path of movement of said carriage, and said machine further including trip means for said switches interconnected to said carriage and movable therewith to actuate said switch and reverse the operation of said second power means to retract said saws from engagement with said tube stock.

20. The cutoff machine according to claim 16 further including a removal conveyor adjacent the discharge end of said frame and an air nozzle supported above the path of movement of the tube stock adjacent the region where severance of sections occurs and connected to a source of air under pressure, a control valve having an actuator adjacent the path of movement of said propelling means to move said saws longitudinally, and trip means carried by said propelling means and operable to engage said actuator near the end of movement of said propelling means toward the discharge end of said frame to discharge a blast of air downwardly upon a severed section of tube and positively blow it downwardly onto said removal conveyor.

* * * * *